(12) United States Patent
Masuoka et al.

(10) Patent No.: US 10,812,646 B2
(45) Date of Patent: *Oct. 20, 2020

(54) PORTABLE TERMINAL APPARATUS

(71) Applicant: MAXELL, LTD., Kyoto (JP)

(72) Inventors: Nobuo Masuoka, Kyoto (JP); Yasunobu Hashimoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/576,079

(22) Filed: Sep. 19, 2019

(65) Prior Publication Data

US 2020/0068062 A1 Feb. 27, 2020

Related U.S. Application Data

(63) Continuation of application No. 16/370,233, filed on Mar. 29, 2019, now Pat. No. 10,462,278, which is a
(Continued)

(51) Int. Cl.
*H04M 3/00* (2006.01)
*H04M 1/725* (2006.01)
*G08C 17/02* (2006.01)

(52) U.S. Cl.
CPC ........ *H04M 1/72533* (2013.01); *G08C 17/02* (2013.01); *G08C 2201/12* (2013.01); *G08C 2201/30* (2013.01); *G08C 2201/93* (2013.01)

(58) Field of Classification Search
CPC .......... H04M 1/72533; H04M 2250/02; H04N 2005/4425; H04W 12/001; H04W 12/02;
(Continued)

(56) References Cited

U.S. PATENT DOCUMENTS 8,630,623 B2 * 1/2014 Park ..................... G06F 3/0488
455/411
8,756,511 B2 6/2014 Heo et al.
(Continued)

FOREIGN PATENT DOCUMENTS

JP 2005-295168 A 10/2005
JP 2006-203831 A 8/2006
(Continued)

OTHER PUBLICATIONS

U.S. PTO Non-Final Office Action issued in related parent U.S. Appl. No. 16/370,233, dated Apr. 24, 2019.
(Continued)

*Primary Examiner* — Shantell L Heiber
(74) *Attorney, Agent, or Firm* — McDermott Will & Emery LLP

(57) ABSTRACT

A portable terminal apparatus includes a display unit displaying an image, an operation input unit inputting a user operation, and a wireless communication unit performing wireless communication by a wireless LAN, and at a time of startup from a sleep state, a remote control button is displayed on the display unit when a mutual communication with a predetermined access point can be performed in the wireless communication unit, and when the remote control button is selected, a remote control signal corresponding to the selected remote control button is transmitted.

25 Claims, 9 Drawing Sheets

Figure 1:
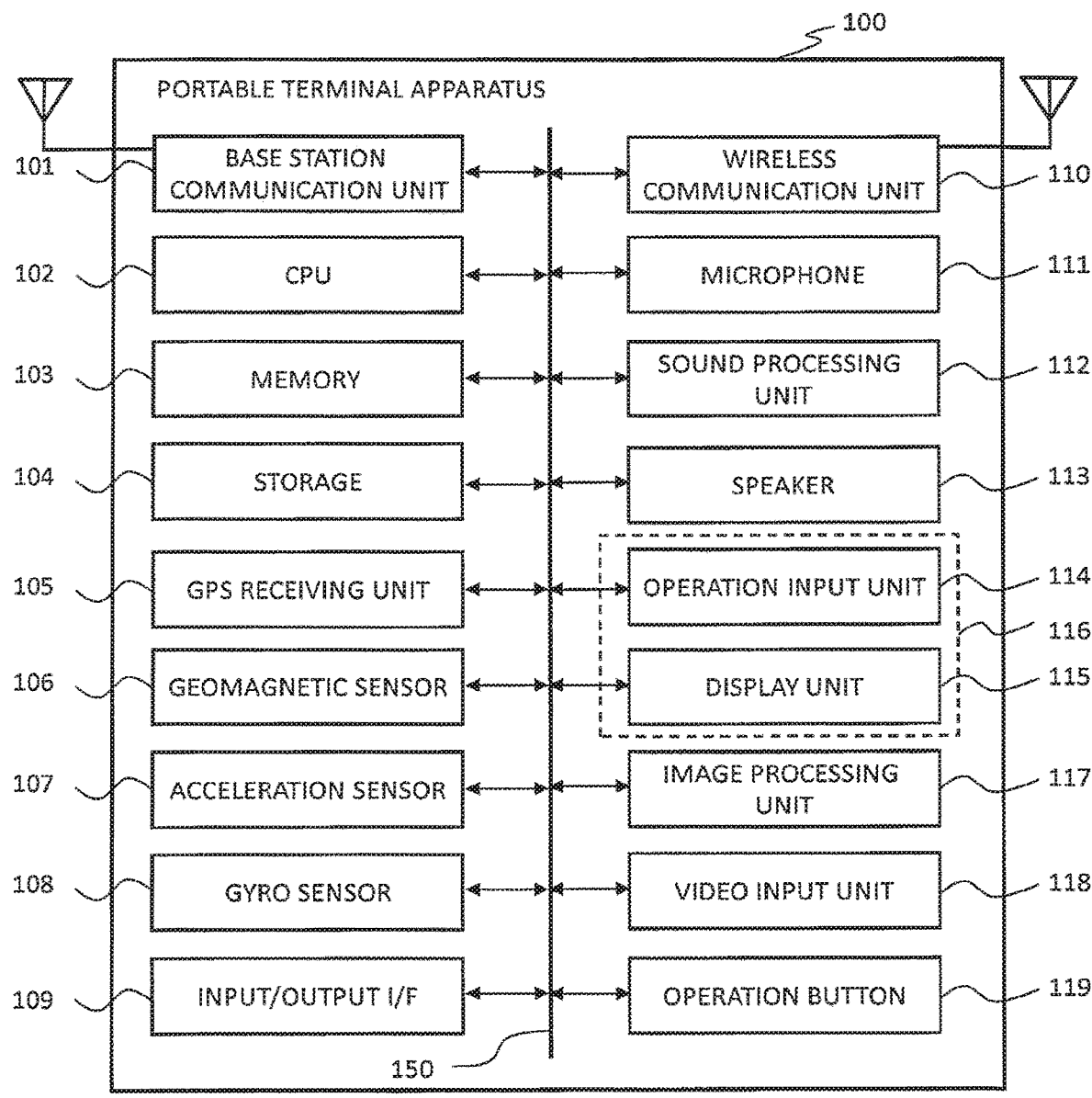

Related U.S. Application Data continuation of application No. 15/326,365, filed as application No. PCT/JP2014/068826 on Jul. 15, 2014, now Pat. No. 10,298,737.

(58) Field of Classification Search
CPC ............. H04W 12/06; H04W 12/0602; H04W 12/0608; H04W 12/12
See application file for complete search history.

(56) References Cited

U.S. PATENT DOCUMENTS

| | | | |
|---|---|---|---|
| 9,922,347 B1 | 3/2018 | Burcham et al. | |
| 2007/0290876 A1 | 12/2007 | Sato et al. | |
| 2012/0113061 A1 | 5/2012 | Ikeda | |
| 2012/0154108 A1 | 6/2012 | Sugaya | |
| 2013/0069888 A1* | 3/2013 | Cho | G06F 1/3265 345/173 |
| 2014/0019994 A1 | 1/2014 | Miyazawa | |
| 2014/0109024 A1* | 4/2014 | Miyazaki | G06F 3/04883 715/863 |

FOREIGN PATENT DOCUMENTS

| | | |
|---|---|---|
| JP | 2011-048665 A | 3/2011 |
| JP | 2012-142907 A | 7/2012 |
| JP | 2013-025357 A | 2/2013 |
| JP | 2014-014194 A | 1/2014 |
| JP | 2014-017735 A | 1/2014 |
| JP | 2014-056469 A | 3/2014 |

OTHER PUBLICATIONS

U.S. PTO Notice of Allowance issued in related parent U.S. Appl. No. 16/370,233, dated Aug. 28 2019.

Entire U.S. PTO of related U.S Appl. No. 16/370,233, filed Mar. 29, 2019 and U.S. Appl. No. 15/326,365, filed Jan. 13, 2017.

Search Report issued in corresponding International Patent Application No. PCT/JP2014/068826, dated Sep. 30, 2014, with English Translation.

Non-Final Office Action issued in related parent U.S. Appl. No. 15/326,365, dated Apr. 27, 2018.

Notice of Allowances issued in related parent U.S. Appl. No. 15/326,365, dated Jan. 2, 2019.

* cited by examiner

FIG. 7

| | STATE AT TIME OF RELEASING SLEEP STATE | | LOCK SCREEN |
|---|---|---|---|
| | WIRELESS LAN | COMMUNICATION WITH AP | |
| Case1 | OFF | — | NORMAL |
| Case2 | ON | IMPOSSIBLE | |
| Case3 | ON | POSSIBLE | REMOTE CONTROL DISPLAY |

FIG. 9

|  | STATE BEFORE SLEEP STATE | COMMUNICATION WITH AP | LOCK SCREEN |
|---|---|---|---|
| Case1 | OTHER THAN REMOTE CONTROL | – | NORMAL |
| Case2 | REMOTE CONTROL | IMPOSSIBLE | |
| Case3 | REMOTE CONTROL | POSSIBLE | REMOTE CONTROL DISPLAY |

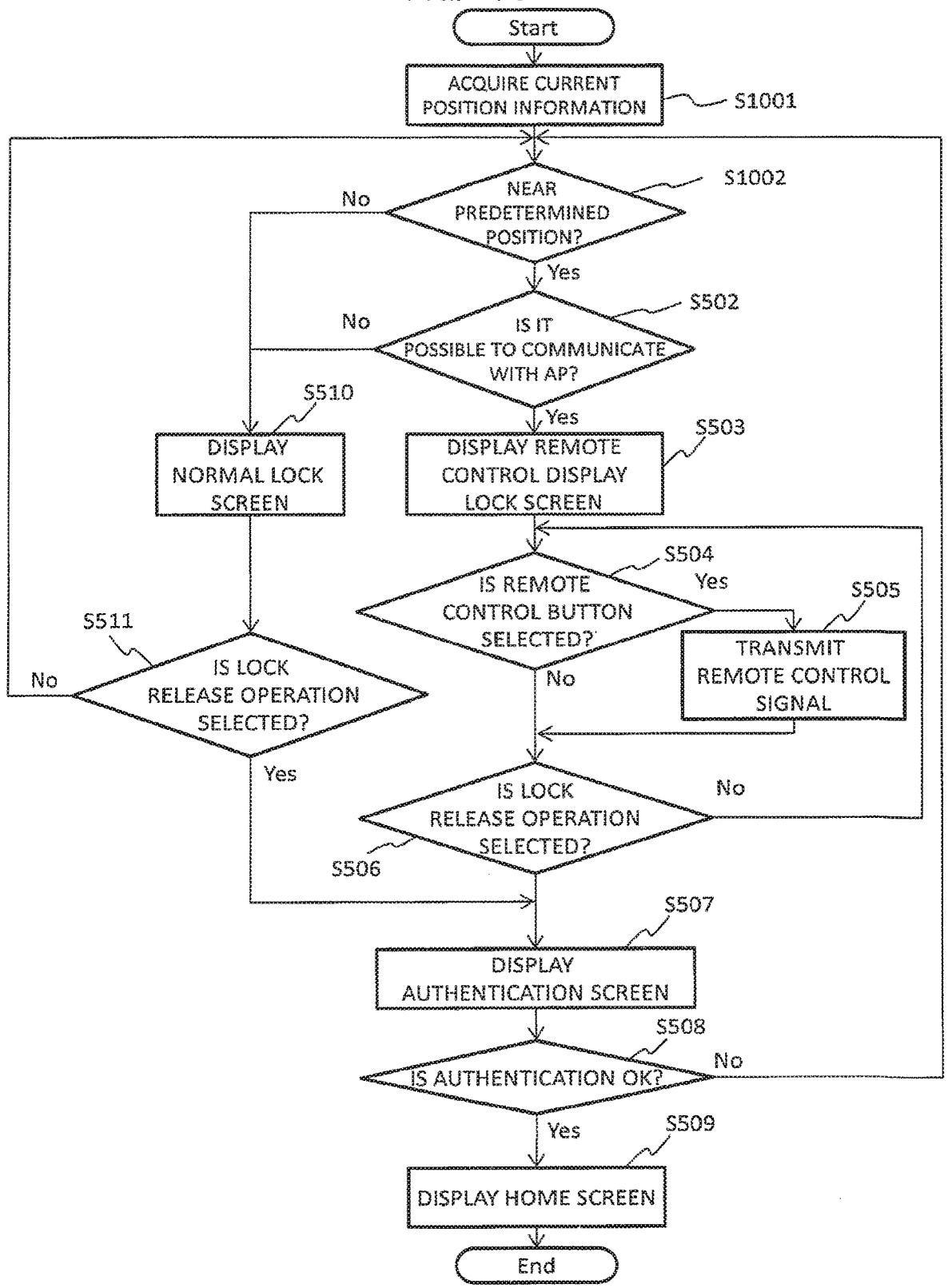

PORTABLE TERMINAL APPARATUS

CROSS REFERENCE

This application is a Continuation of U.S. patent application Ser. No. 16/370,233, filed on Mar. 29, 2019 which is a Continuation of U.S. patent application Ser. No. 15/326,365, filed on Jan. 13, 2017, now U.S. patent Ser. No. 10/298,737, issued on May 21, 2019, which is the U.S. National Phase under 35 U.S.C. § 371 of International Application No. PCT/JP2014/068826, filed on Jul. 15, 2014, the entire contents of each are hereby incorporated by reference.

TECHNICAL FIELD

The present invention relates to a portable terminal apparatus.

BACKGROUND ART

In recent years, portable terminal apparatuses on which touch panels are mounted, for example, a smartphone, have been widely used. These portable terminal apparatuses include a lock function to prevent unintended input operations. In addition, in order to prevent an unauthorized operation by a third party, password authentication, pattern authentication, and the like are used to release the lock function (Patent Documents 1 and 2).

Furthermore, in recent years, by using a wireless LAN function mounted in a portable terminal apparatus, it is possible to remotely control electronic devices such as a television apparatus and a recorder apparatus via the LAN (Patent Document: 3).

RELATED ART DOCUMENTS

Patent Documents

Patent Document 1: Japanese Patent Application Laid-Open Publication No. 2011-48665
Patent Document 2: Japanese Patent Application Laid-Open Publication No. 2013-25357
Patent Document 3: Japanese Patent Application Laid-Open Publication No. 2006-203831

SUMMARY OF THE INVENTION

Problems to be Solved by the Invention

Remote control operations on a television apparatus by using a portable terminal apparatus include a channel selection operation at the start of viewing, a volume control operation during viewing, and a channel selection operation at the end of a given program to select a next program to be viewed. When, for example, selecting a program to be viewed, the user continuously performs a plurality of remote control operations such as "displaying a program guide," "selecting a desired program to be viewed," and "starting to view (channel selection)." In addition, the user often performs remote control operations after a few minutes or more has passed since a previous remote control operation such as remote control operations when performing volume control during viewing or selecting a next program to be viewed after the end of a viewed program.

In order to suppress battery consumption, a portable terminal apparatus is often set such that the portable terminal apparatus is put into a sleep state when a predetermined time (e.g., 30 seconds) of a non-operation state passes. When the above predetermined time has passed since the previous remote control operation, since the portable terminal apparatus is put into the sleep state, it is necessary to start up the portable terminal apparatus before performing a remote control operation.

As described above, in order to prevent an unauthorized operation by a third party, the lock function is active at the time of startup, and hence, it is necessary to release the lock function by the password authentication or the pattern authentication. That is, when the apparatus is in the sleep state, it is necessary to perform a lock function release operation such as the password authentication or the pattern authentication before performing a remote control operation. This leads to poor operability as a remote controller. Setting a mode of releasing the lock function without authentication can improve the operability to some extent. In this case, however, it is not possible to prevent an unauthorized, operation by a third party, causing a security problem.

In view of the above problem, the present invention provides a portable terminal apparatus having high operability as a remote controller while ensuring security performance.

Means for Solving the Problems

In order to solve the above problem, the typical ones of the inventions disclosed in the present application will be briefly described as follows.

(1) A portable terminal apparatus includes a display unit displaying an image, a wireless communication unit performing wireless communication, and a control unit, and the portable terminal apparatus has a feature that the control unit determines whether remote control of an external apparatus can be performed by using the portable terminal apparatus via the wireless communication unit, at a time of startup from a sleep state, and controls such that a remote control button is displayed on the display unit in accordance with the startup from the sleep state, when it is determined that remote control can be performed.

(2) A portable terminal apparatus includes a display unit displaying an image, an operation input unit inputting a user operation, and a wireless communication unit performing wireless communication by a wireless LAN, and the portable terminal apparatus has a feature that, at a time of startup from a sleep state, a remote control button is displayed on the display unit when a mutual communication with a predetermined access point can be performed in the wireless communication unit, and when the remote control button is selected, a remote control signal corresponding to the selected remote control button is transmitted.

(3) A portable terminal apparatus includes a display unit displaying an image, an operation input unit inputting a user operation, and a wireless communication unit performing wireless communication by a wireless LAN, and the portable terminal apparatus has a feature that, when the portable terminal apparatus is put into a sleep state with a remote control screen being displayed, a remote control button is displayed on the display unit at a time of startup from the sleep state when a mutual communication with a predetermined access point can be performed in the wireless communication unit, and when the remote control button is selected, a remote control signal corresponding to the selected remote control button is transmitted.

(4) A portable terminal apparatus includes a display unit displaying an image, an operation input unit inputting a user operation, a GPS receiving unit acquiring a position, and a wireless communication unit performing wireless communication by a wireless LAN, and the portable terminal apparatus has a feature that, at a time of startup from a sleep state, a remote control button is displayed on the display unit when a position is acquired by the GPS receiving unit and the position is near a predetermined position, and when the remote control button is selected, a remote control signal corresponding to the selected remote control button is transmitted.

(5) A portable terminal apparatus includes a display unit displaying an image, an operation input unit inputting a user operation, and a wireless communication unit performing wireless communication, and the portable terminal apparatus has a feature that the portable terminal apparatus includes a determination unit determining whether the portable terminal apparatus is located in a user area, a remote control button is displayed on the display unit at a time of startup from a sleep state when the determination unit determines that the portable terminal apparatus is located in the user area, and when the remote control button is selected, a remote control signal corresponding to the selected remote control button is transmitted.

Effects of the Invention

The present invention can provide a portable terminal apparatus having high operability as a remote controller while ensuring security performance. Problems, configurations, and effects other than those described above will become obvious from the description of the following embodiments.

BRIEF DESCRIPTIONS OF THE DRAWINGS

Figure 2:
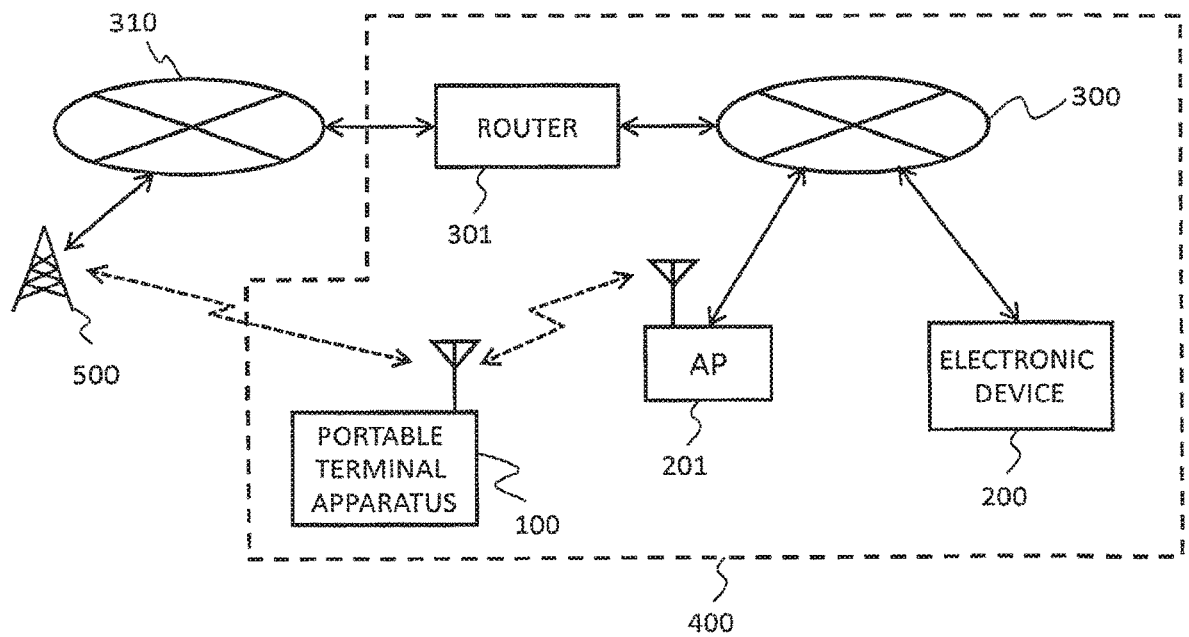
Figure 3:
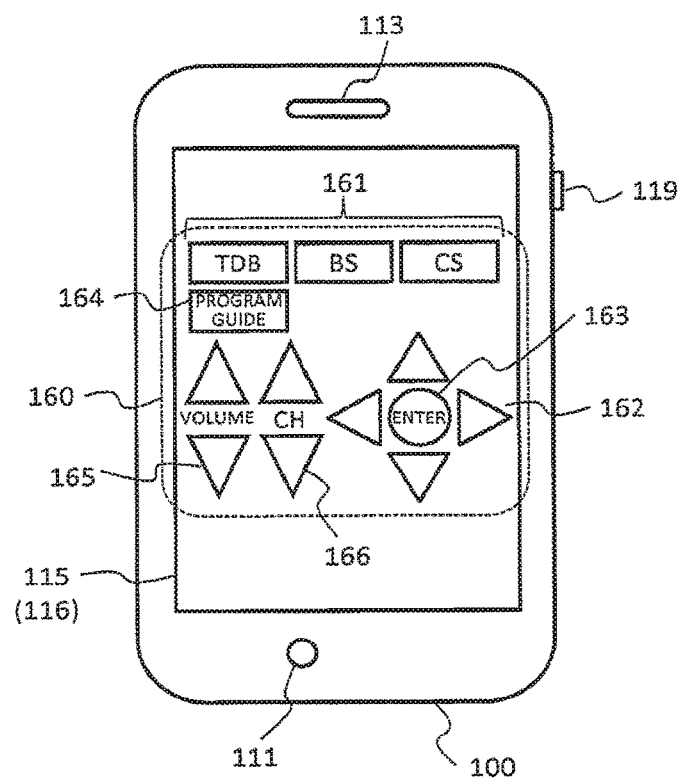
Figure 4A:
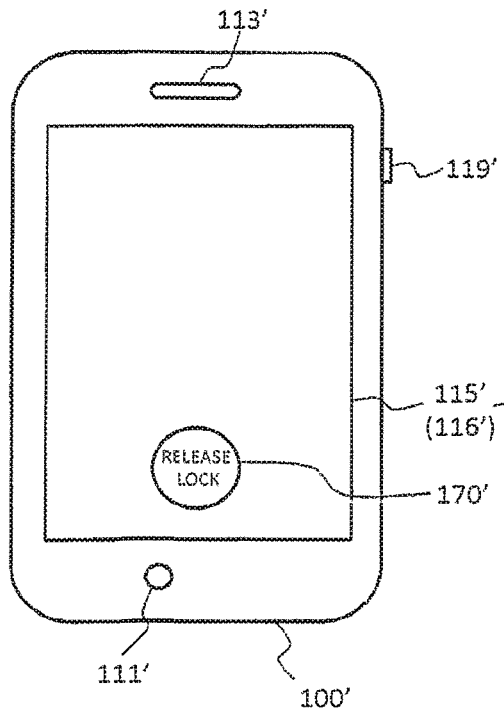
Figure 4B:
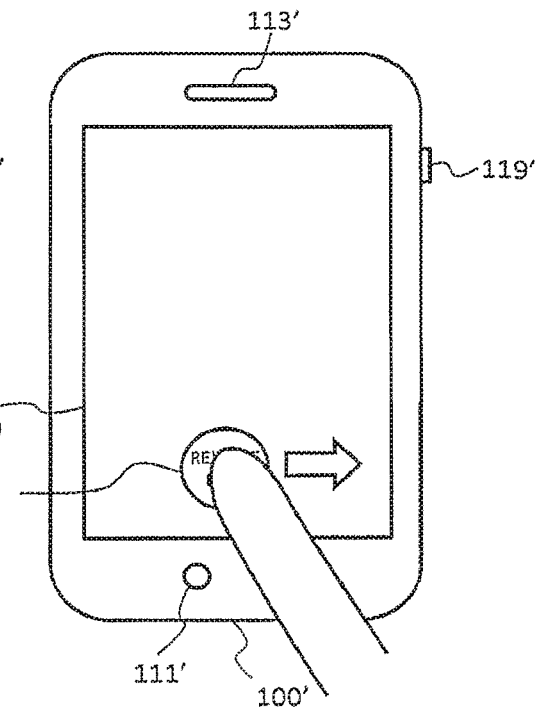
Figure 4C:
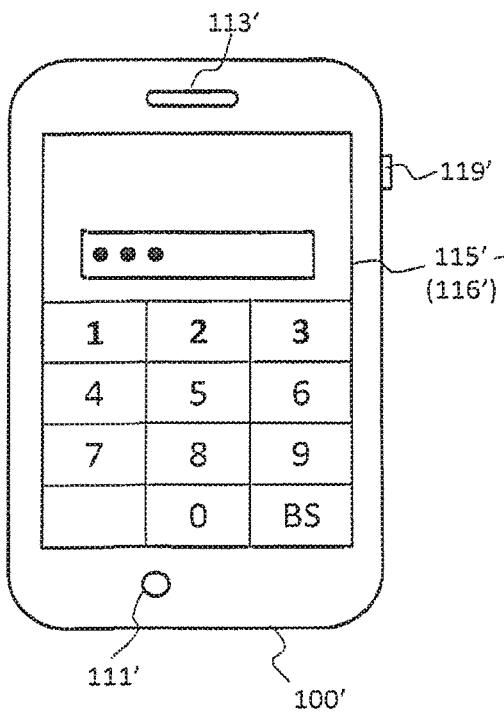
Figure 4D:
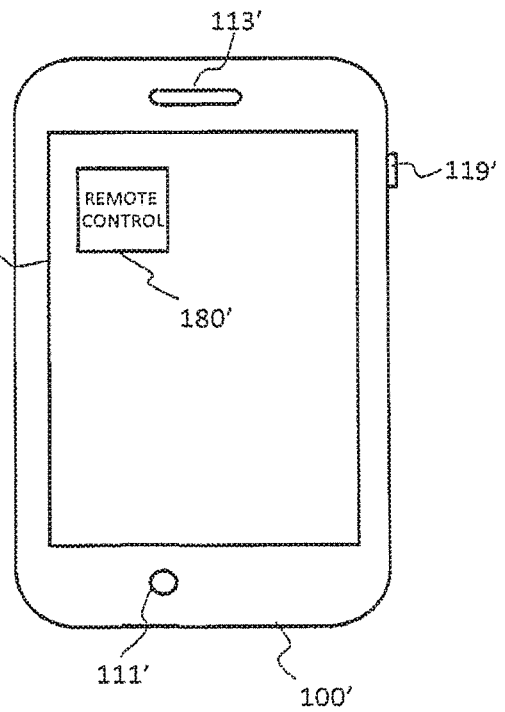
Figure 5:
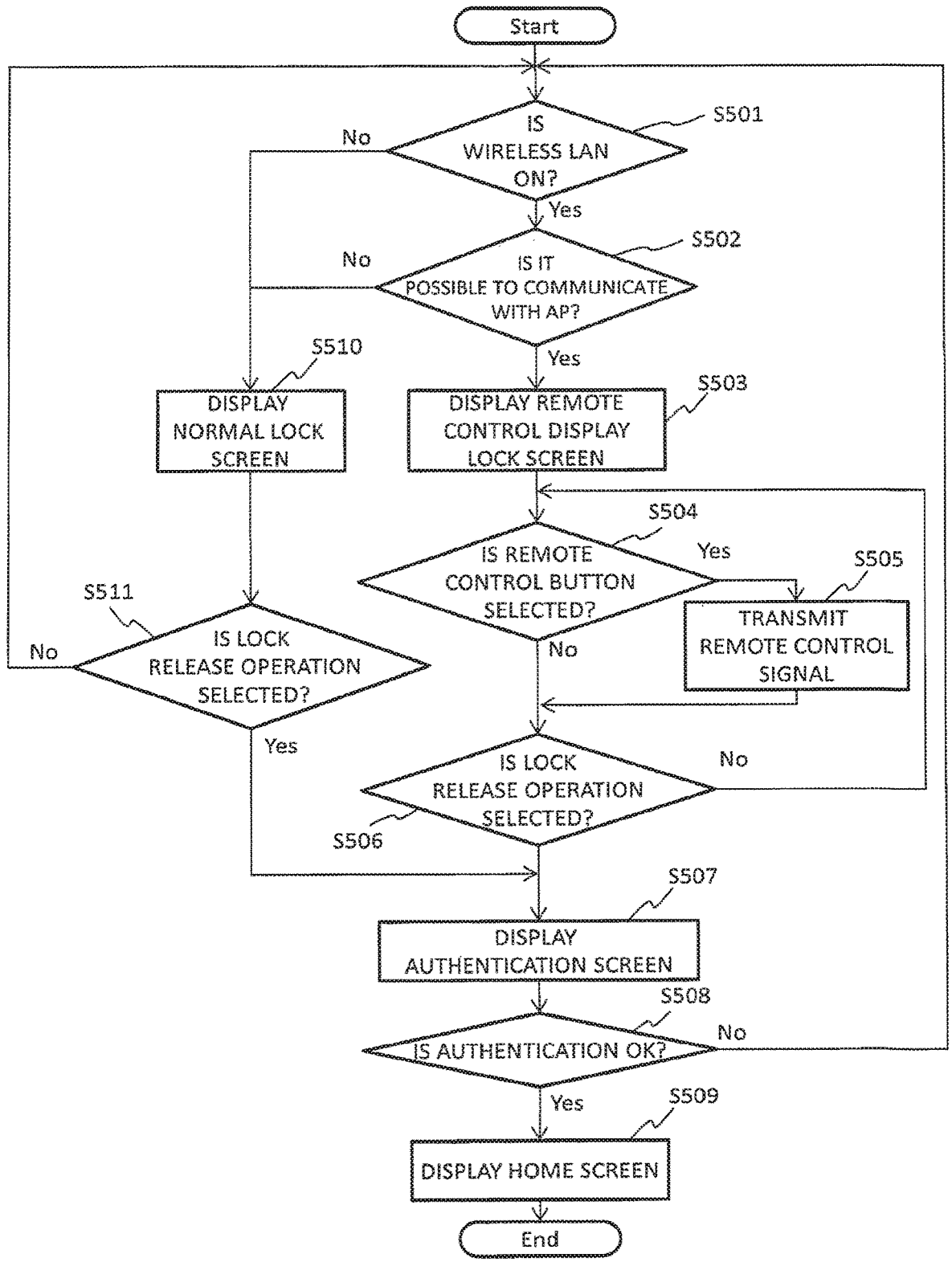
Figure 8:
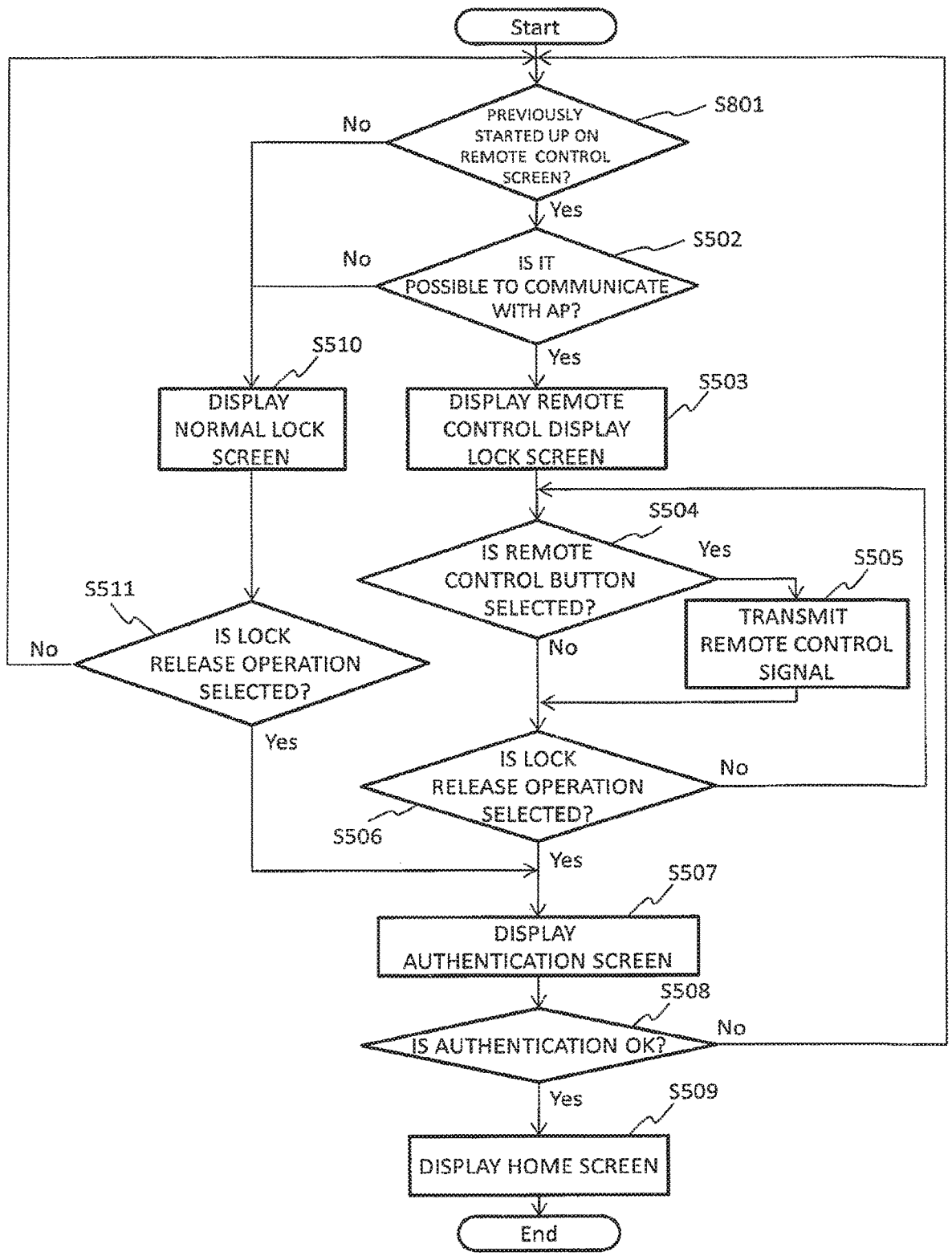

FIG. 1 is a block diagram showing an example of an internal configuration of a portable terminal apparatus according to a first embodiment;
FIG. 2 is a view showing a configuration example of an entire system when an electronic device is remotely controlled;
FIG. 3 is a view showing a display example when an electronic device (TV) is remotely controlled in the portable terminal apparatus;
FIGS. 4(a) to 4(d) are views for explaining an operation of starting up a portable terminal apparatus from a sleep state;
FIG. 5 is a flowchart showing an operation of the portable terminal apparatus;
FIGS. 6(a) to 6(d) are views showing an example of a lock screen of the portable terminal apparatus;
FIG. 7 is a table summarizing a correspondence between a state at a time of releasing the sleep state and a lock screen;
FIG. 8 is a flowchart showing an operation of a portable terminal apparatus according to a second embodiment;
FIG. 9 is a table summarizing a correspondence among a state immediately before the sleep state, a communication state with an AP at the time of releasing the sleep state, and a lock screen; and
FIG. 10 is a flowchart showing an operation of a portable terminal apparatus according to a third embodiment.

DETAILED DESCRIPTION OF PREFERRED EMBODIMENTS

Each embodiment will be described below with reference to the accompanying drawings.

First Embodiment

FIG. 1 is a block diagram showing an example of an internal configuration of a portable terminal apparatus 100 according to a first embodiment.

Here, a smartphone will be described by way of example. The portable terminal apparatus 100 is constituted by appropriately using a base station communication unit 101, a CPU 102, a memory 103, a storage 104, a GPS (Global Positioning System) receiving unit 105, a geomagnetic sensor 106, an acceleration sensor 107, a gyro sensor 108, an input/output I/F 109, a wireless communication unit 110, a microphone 111, a sound processing unit 112, a speaker 113, an operation input unit 114, a display unit 115, a touch panel 116, an image processing unit 117, a video input unit 118, and an operation button 119. The respective units are mutually connected to a bus 150. Note that the respective functional units may be integrally or separately formed as needed.

The base station communication unit 101 is a communication interface which performs long-distance wireless communication with a base station (not shown) such as a W-CDMA (Wideband Code Division Multiple Access) base station or GSM (Global System for Mobile communications (registered trademark)) base station.

The CPU 102 controls the respective configuration units by executing a program stored in the memory 103 and performs various types of processing.

The memory 103 is, for example, a flash memory, which stores a program, data, and the like. The base station communication unit 101 performs wireless communication with a base station 500 to download a program to be stored in the memory 103 from an external server and the like (not shown) and accordingly, the program can be updated or a new program can be added, as needed. In addition, the portable terminal apparatus 100 includes the storage 104 such as a memory card, as needed, and can save data and the like in the storage 104.

The GPS receiving unit 105 receives a signal from a GPS satellite in the sky. This makes it possible to detect a current position of the portable terminal apparatus 100.

The geomagnetic sensor 106 is a sensor detecting the direction in which the portable terminal apparatus 100 is oriented. The acceleration sensor 107 is a sensor detecting an acceleration of the portable terminal apparatus 100. The gyro sensor 108 is a sensor detecting an angular velocity of the portable terminal apparatus 100. By using these sensors, a tilt and movement of the portable terminal apparatus 100 can be precisely detected.

The input/output I/F 109 is, for example, a USB (Universal Serial Bus), which is an interface for transmitting and receiving data to and from an external device (not shown). The wireless communication unit 110 is a communication interface which performs near field wireless communication, and uses, as a communication scheme, for example, a wireless LAN such as IEEE802.11a/b/n, Bluetooth (registered trademark) communication, or infrared communication.

The microphone 111 receives an external sound. The speaker 113 outputs a sound to the outside. The sound processing unit 112 processes input and output sounds. The couch panel 116 constituted by appropriately using the operation input unit 114 and the display unit 115. The display unit 115 is a liquid crystal panel or the like, which displays a video and an image. A display screen of the display unit 115 has the operation input unit 114 such as a touch pad.

The operation input unit 114 is, for example, a touch pad such as a capacitive touch pad and detects a contact operation (to be referred to as a touch, hereinafter) with a finger or a touch pen. For example, the display unit 115 displays a command (function) menu or the like, and the user then selects a desired command by touch. Accordingly, the operation input unit 114 detects the touch position to receive a command displayed at the touch position. The touch or the touch operation received by the operation input unit 114 is input to the CPU 102 to be processed. Note that the operation input unit 114 may be configured to detect an approaching operation as well as the contact operation.

The video input unit 118 is, for example, a camera. A video displayed on the display unit 115 and a video input from the video input unit 118 are processed by the image processing unit 117. The video input unit 118 may be provided on, for example, each of a first surface of the portable terminal apparatus 100 and a second surface as a back surface of the apparatus, and a plurality of video input units may be provided.

The operation button 119 is, for example, a push button switch. When pressing of the operation button 119 is detected, the corresponding information is input to the CPU 102, and an operation corresponding to the operation button 119 is executed. Note that a plurality of operation buttons 119 may be used, and simultaneous operations with a plurality of operation buttons 119 or simultaneous operations with the operation input unit 114 and the operation button 119 may be received as one operation instruction.

FIG. 2 is a view showing a configuration example of an entire system when an electronic device is remotely controlled in the portable terminal apparatus 100. Here, the wireless communication unit 110 uses a wireless LAN as a communication scheme by way of example.

An electronic device 200 includes a television receiver (to be referred to as a TV, hereinafter), a recording/reproducing apparatus (to be referred to as a recorder, hereinafter) using an HDD (Hard Disk Drive), BD (Blu-ray (registered trademark) Disc), or DVD (Digital Versatile Disc) as a recording medium (to be referred to as a storage, hereinafter), and a storage reproducing apparatus (to be referred to as a player, hereinafter). In addition, each of these apparatuses may be an in-car TV and the like which can connect to a network. In the following, a case in which the electronic device 200 is a TV will be described by way of example. The electronic device 200 is connected to a home network 300 as a LAN (Local Area Network) implemented by IEEE802.3 Ethernet (registered trademark) or the like. The portable terminal apparatus 100 is connected to an access point (to be referred to as an AP, hereinafter) 201 via the wireless LAN. The AP 201 is connected to the home network 300. The portable terminal apparatus 100 is connected to the home network 300 via the AP 201.

As described above, since the portable terminal apparatus 100 and the electronic device 200 are connected to the same home network 300, the portable terminal apparatus 100 and the electronic device 200 can communicate with each other via the home network 300. Therefore, the portable terminal apparatus 100 can remotely control the electronic device 200 by transmitting a remote control signal to the electronic device 200 via the home network 300.

An area 400 surrounded by the dotted line indicates a user area. The user area is a predetermined area such as a home or an office used by the user. As illustrated in the drawing, a router 301 is connected to an external network 310 such as the Internet, and the portable terminal apparatus 100, the electronic device 200, and the like arranged in the user area 400 can mutually communicate with the external network 310 via the router 301.

The portable terminal apparatus 100 is connected to the AP 201 via the wireless LAN, as described above. That is, when the portable terminal apparatus 100 can communicate with the AP 201, the portable terminal apparatus 100 can be considered to be located in the user area 400. When the portable terminal apparatus 100 cannot communicate with the AP 201, the portable terminal apparatus 100 can be considered to be located outside the user area 400, for example, at a place outside the home.

In addition, the portable terminal apparatus 100 can wirelessly communicate with the base station 500. The portable terminal apparatus 100 can also mutually communicate with the external network 310 via the base station 500. As described above, since the home network 300 is also connected to the external network 310 via the router 301, the portable terminal apparatus 100 can also communicate with the electronic device 200 via the base station 500, the external network 310, the router 301, and the home network 300.

As described above, the portable terminal apparatus 100 can remotely control the electronic device 200 via the home network 300. FIG. 3 is a view showing a display example of the portable terminal apparatus 100 when the electronic device 200 (TV) is remotely controlled by using the portable terminal apparatus 100.

As shown in FIG. 3, the display unit 115 displays remote control buttons 160 such as a broadcast wave selection button 161, a cursor button 162, an enter button 163, a program guide display button 164, a volume control button 165, and a channel selection button 166, as needed. In this case, various types of buttons displayed on the display unit 115 are not limited to those shown in FIG. 3, and may be those using icons expressed by pictures and symbols.

The user performs a touch operation on the desired remote control button 160. The touch panel 116 detects the touch position on the touch panel 116 and transmits the detected information to the CPU 102. The CPU 102 generates a control command, corresponding to the remote control button 160 displayed at the touch position, based on the detected information. In this case, correspondence table data between various types of remote control buttons and control commands is stored in the memory 103. The CPU 102 transmits the generated control command from the wireless communication unit 110 to the electronic device 200. In this manner, the portable terminal apparatus 100 can remotely control the electronic device 200.

When, for example, performing an operation for selecting a program to be viewed, the user selects the program, guide display button 164 by touch, displays a program guide on the screen of the electronic device 200 (TV), selects a desired program to be viewed with the cursor button 162, selects the enter button 163 by touch, and makes the current program switch to the selected program (channel), thereby allowing the user to view the program.

In this manner, although the user sometimes continuously performs a plurality of remote control operations, the user often performs a remote control operation after a few minutes or more has passed since a previous remote control operation such as a remote control operation when performing volume control during viewing or selecting a next program to be viewed after the end of a viewed program. Here, in general, in order to suppress battery consumption, a portable terminal apparatus is set to be put into the sleep state when a predetermined time (e.g., 30 seconds) of a non-operation state passes. When the above predetermined time has passed since previous remote control operation, since the portable terminal apparatus is in the sleep state, it is necessary to start up the portable terminal apparatus before performing a remote control operation.

FIG. 4 is views for explaining the operation of starting up a conventional portable terminal apparatus 100' from a sleep state. When the user presses an operation button 119' in the sleep state, the apparatus displays a screen on which a lock release button 170' is displayed on a display unit 115', as shown in FIG. 4(a), for example. This state is called a lock screen. As shown in FIG. 4(b), for example, when the user touches the lock release button 170' and transversely slides it with his/her finger, the current screen shifts to a password input screen like that shown in FIG. 4(c), for example.

In this case, the user inputs a password. When the input password matches a preset password, the lock is released, and the home screen appears (FIG. 4(d)) to allow the user to use the apparatus. When the user selects a remote control icon 180' on the home screen by touch, a remote control screen like that shown in FIG. 3 appears to allow the user to perform remote control of the electronic device 200. That is, when a predetermined time has passed since a previous operation, the portable terminal apparatus 100' is set to the sleep state, as described above. When performing remote control of the electronic device 200 again, it is necessary to perform the above lock release operation, and as a result, there is a problem that the apparatus is poor in operability.

In consideration of this problem, the portable terminal apparatus 100 according to the present embodiment performs an operation described below.

FIG. 5 is a flowchart showing the operation of the portable terminal apparatus 100 according to the present embodiment.

The operation in the flowchart shown in FIG. 5 starts when the portable terminal apparatus 100 in the sleep state is released from a sleep mode by pressing the operation button 119, for example.

When the operation starts, an activation status of the wireless LAN is checked (step S501). Since the portable terminal apparatus 100 is configured to allow for ON/OFF setting of the wireless LAN function, it is checked whether the wireless LAN function is ON. When the wireless LAN function is OFF (NO in step S501), the portable terminal apparatus 100 moves to step S510 to start up on a normal lock screen and then moves to step S511 to check whether the lock release operation is selected.

FIG. 6 is views showing an example of the lock screen of the portable terminal apparatus 100 according to the present embodiment. FIG. 6(a) shows an example of the normal lock screen displayed in step S510 described above. As shown in the drawing, only a lock release button 170 is displayed on the touch panel 116. In this state, when the user touches the lock release button 170 and transversely slides it with his/her finger, the lock release operation is selected (YES in step S511), and the lock function is released. The process then moves to step S507 to display an authentication screen. The authentication screen will be described in detail later.

In step S511 to check whether the lock release operation is selected, when the user does not select the lock release operation (NO in step S511), the process returns to step S510 to check the activation status of the wireless LAN.

In step S501 to check the activation status of the wireless LAN, when the wireless LAN function is ON (YES in step S501), it checked whether it is possible to communicate with the AP 201 (step S502). Wireless LAN communication with the AP 201 is performed through authentication and encryption to prevent unauthorized communication by a third party. An encryption scheme used includes WEP (Wired Equivalent Privacy), WPA (WiFi Protected Access), and WPA2.

In step S502 to check whether it is possible to communicate with the AP 201, when it is not possible to communication with the AP 201 (NO in step S502), the process moves to step S510 to start up on the normal lock screen and then moves to step S511 to check whether the lock release operation is selected, as in the case in which the above wireless LAN function is OFF (NO in step S501).

Figure 6A:
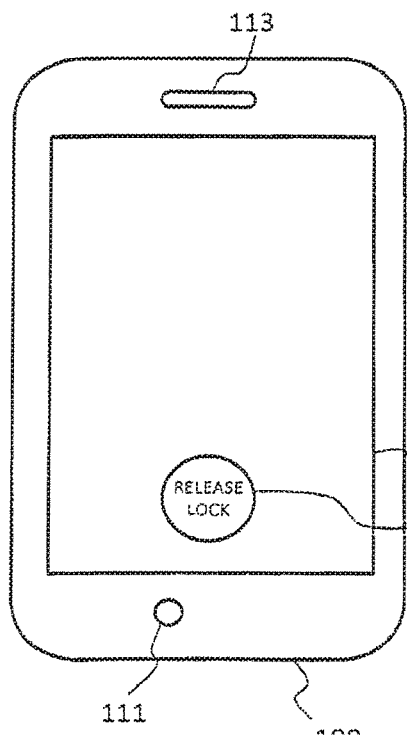
Figure 6B:
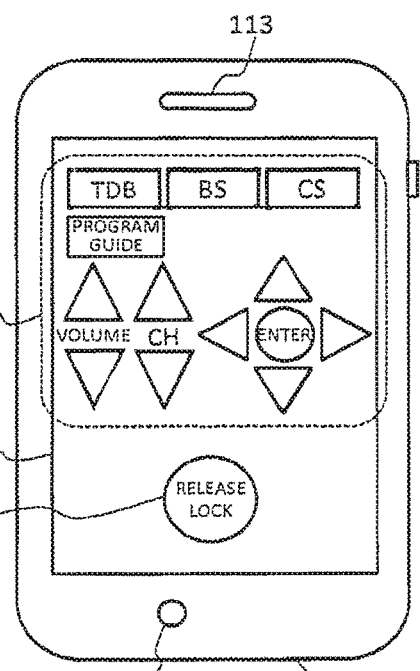

In step S502 to check whether it is possible to communicate with the AP 201, when it is possible to communicate with the AP 201 (YES in step S502), it is determined that remote control can be performed. The process moves to step S503 to start up a remote control display lock screen and then moves to step S504 to check whether the remote control button 160 is selected. FIG. 6(b) shows an example of the above remote control display lock screen. As shown in FIG. 6(b), the lock release button 170 and the remote control button 160 are displayed on the touch panel 116.

In step S504 to check whether the remote control button 160 is selected, when the user selects the desired remote control button 160 by touch (YES in step S504) the remote control signal corresponding to the remote control button 160 touched by the user is transmitted to the electronic device 200 (step S505). The process then moves to step S511 to check whether the lock release operation is selected.

In step S504 to check whether the remote control button 160 is selected, when no remote control button is selected (NO in step S504), the process moves to step S506 to check whether the lock release operation is selected.

Figure 6C:
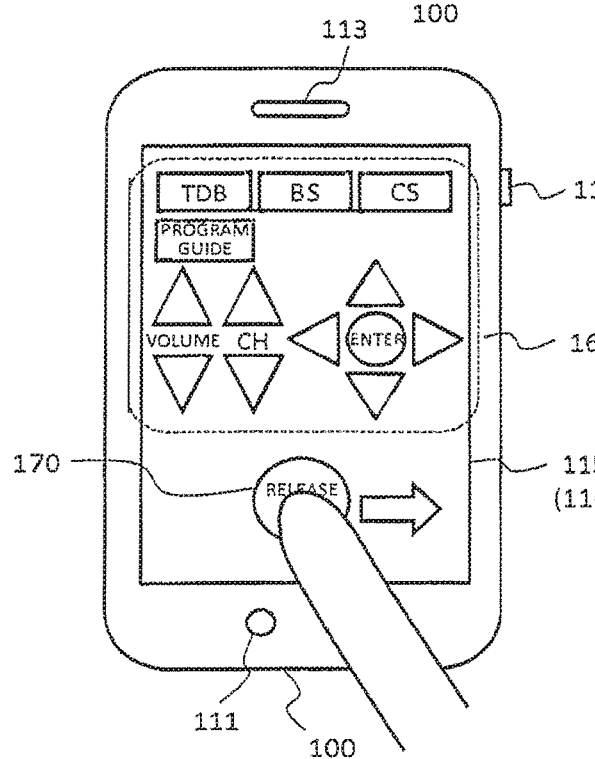

In step S506 to check whether the lock release operation is selected, as shown in FIG. 6(c), for example, when the user touches the lock release button 170 and transversely slides it with his/her finger so as to select the lock release operation (YES in step S506), the lock function is released, and the process moves to step S507 to display the authentication screen. When the lock release operation is not selected (NO in step S506), the process returns to step S504 to check whether a remote control button is selected.

Figure 6D:
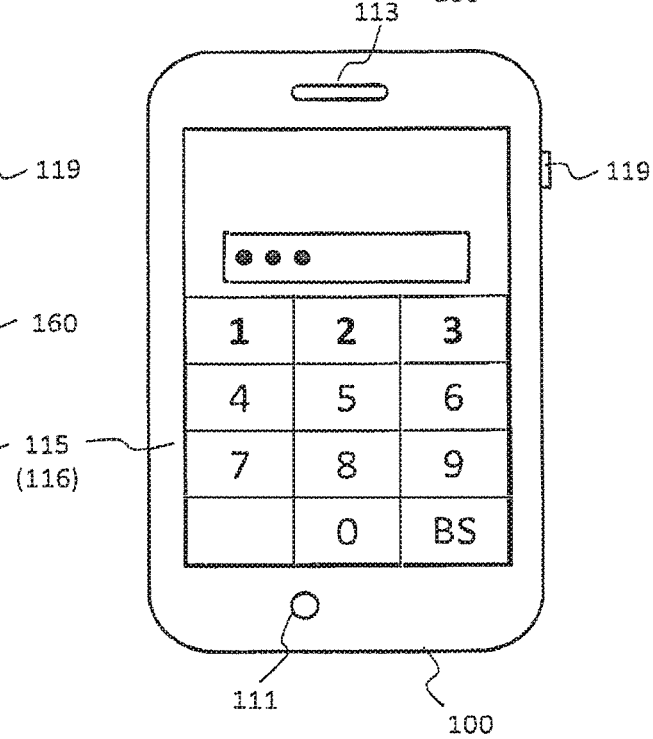

An authentication screen displayed in step S507 is a password input screen like that shown in FIG. 6(d), for example. When the user inputs a password on this screen, the process moves to step S508 to perform authentication. In step S508, it is checked whether the password input by the user matches a preset password. If the Password matches the preset password (authentication is OK; YES in step S508), the home screen is displayed (step S509), and the processing ends. When the password does not match the preset password (authentication is NG; NO in step S508), the process returns to step S501 to check the first activation status of the wireless LAN.

As described above, according to the portable terminal apparatus 100 according to the present embodiment, there can be provided a portable terminal apparatus having high operability as a remote controller while ensuring security performance because the remote control buttons 160 are displayed to remotely control an electronic device without performing lock release processing, as shown in FIG. 6(b).

Note that the display example of the remote control buttons 160 before lock release processing is not limited to that shown in FIG. 6(b) and can be variously changed. The remote control buttons 160 need not always be displayed simultaneously with the lock release button. In addition, assume that a button which allows the user to select whether to display the remote control buttons is temporarily displayed together with the lock release button 170. In this case, when the user selects to display the remote control buttons 160, the remote control buttons 160 may be displayed.

FIG. 7 is a table summarizing a correspondence between a state at the time of releasing the sleep state and a lock screen.

The first case is a case in which the LAN function of the portable terminal apparatus 100 is OFF at the time of releasing the sleep state. In this case, the apparatus is started up with the normal lock screen being displayed on the touch panel 116. This is a state in which the user intentionally sets the wireless LAN function OFF. In remote control of the electronic device 200 with the portable terminal apparatus 100, the portable terminal apparatus 100 communicates with the electronic device 200 via a wireless LAN. That is, setting the wireless LAN function OFF indicates that the user has no intention to remotely control the electronic device 200. Therefore, there is no problem in starting up the apparatus with the normal lock screen.

The second case is a case in which the wireless LAN function is ON at the time of releasing the sleep state, but the portable terminal apparatus 100 cannot communicate with the AP 201. In this case as well, the apparatus is started up with the normal lock screen being displayed on the touch panel 116. This is, for example, a case in which the user uses the portable terminal apparatus 100 outside the home. This state indicates that the portable terminal apparatus 100 is located outside a communication range with the AP 201. The user who is operating the portable terminal apparatus 100 is also located outside the communication range with the AP 201 and hence, is not located near the electronic device 200.

In such a state, the user does not remotely control the electronic device 200, and hence, there is no problem in starting up the apparatus on the normal lock screen. In contrast, in this state, if the user starts up the apparatus on a remote control display lock screen, the remote control screen which cannot be used is displayed, and as a result, the apparatus is poor in operability.

The third case is a case in which the wireless LAN function is ON at the time of releasing the sleep state, and the portable terminal apparatus 100 can communicate with the AP 201. In this case, the user starts up the apparatus on the remote control display lock screen on the touch panel 116. When the portable terminal apparatus 100 is located in the communication range with the AP 201, it can be considered that the user is located in the user area 400. Therefore, the user who is operating the portable terminal apparatus 100 is likely to be located near the electronic device 200.

In this case, since the user is likely to have released the sleep mode of the portable terminal apparatus 100 to remotely control the electronic device 200, starting up the apparatus on the remote control display lock screen allows the user to quickly perform a remote control. This leads to high operability in addition, when wanting to perform an operation other than a remote control operation, the user touches the lock release button 170 with his/her finger and transversely slides it, as in the case of the normal lock screen, and then, through authentication processing, the lock function is released, so that the user can use the apparatus.

As described above, the portable terminal apparatus 100 according to the present embodiment displays the remote control screen when it is possible to communicate with the AP 201, and hence, there is no chance to display the unnecessary remote control display lock screen in a case in which the user releases the sleep mode when he/she is away from the AP 201, such as when he/she is outside the home.

As described above, when controlling the electronic device 200 by transmitting a remote control signal thereto via the wireless LAN, the portable terminal apparatus 100 needs to be communicative with the AP 201 when transmitting the remote control signal. In the present embodiment, in step S502, the portable terminal apparatus 100 checks whether it can communicate with the AP 201, and transmits a remote control signal only when it is possible to communicate with the AP 201 (step S505). This makes it possible to reliably transmit a remote control signal to the electronic device 200.

In addition, as described above, in the portable terminal apparatus 100 according to the present embodiment, even when the third party releases the sleep mode, the remote control display lock screen may be displayed. However, the remote control display lock screen is displayed only when it is possible to communicate with the AP 201. In addition, since only the remote control buttons 160 are permitted to be operated, it is very unlikely to cause a security problem.

Second Embodiment

A portable terminal apparatus 100 according to the second embodiment will be described.

Since the internal configuration, outer appearance, and the like of the portable terminal apparatus 100 are the same as those according to the first embodiment, a description will be omitted. Therefore, the first embodiment will be referred to, as needed.

FIG. 8 is a flowchart showing an operation of the portable terminal apparatus 100 according to the second embodiment. The same reference characters denote the same steps of operations as in the first embodiment, and a detailed description will be omitted.

The operations in the flowchart shown in FIG. 8 start when the user releases the sleep mode by pressing an operation button 119 or the like while the portable terminal apparatus 100 is in the sleep state, as in the first embodiment.

When the operations start, the state of the portable terminal apparatus 100 immediately before the sleep state is checked (step S801). If a remote control screen has been displayed immediately before the sleep state (YES in step S801), the process moves to step S502 to check whether it is possible to communicate with an AP 201. If the remote control screen has not been displayed immediately before the sleep state (NO in step S801), the process moves to step S510 to start up the apparatus on the normal lock screen. Since operations after step S502 to check whether it is possible to communicate with the AP 201 and operations after step S510 which the apparatus is started up on the normal lock screen are the same as those in the first embodiment, a detailed description will be omitted.

FIG. 9 is a table summarizing a correspondence among a state immediately before the sleep state, a communication state with an AP 201 at the time of releasing the sleep state, and a lock screen.

The first case is a case in which a state immediately before the sleep state is a state in which the remote control screen has not been displayed. That is, immediately before the sleep state, the apparatus has performed an operation other than a program for remote control. In this case, the apparatus is started up with the normal lock screen being displayed on a touch panel 116.

The second case is a case in which a state immediately before the sleep state is a state in which the remote control screen has been displayed and it is not possible to communicate with the AP 201. In this case, the apparatus is started up with the normal lock screen being displayed on the touch panel 116. This is, for example, a case in which, although the remote control screen has been displayed immediately before the sleep state and the user has performed a remote control operation, the user has carried the portable terminal apparatus 100 outside in the sleep state. Since the user who is operating the portable terminal apparatus 100 is also located outside the communication range with the AP 201, he/she is not located near an electronic device 200. In such a state, the user does not perform any remote control operation of the electronic device 200, and accordingly, there is no problem in starting up the apparatus on the normal lock screen. In contrast, in this state, if the apparatus is started up on the remote control display lock screen, the remote control screen which cannot be used is displayed, and as a result, the apparatus is poor in operability.

The third case is a case in which a state immediately before the sleep state is a state in which the remote control screen has been displayed and it is also possible to communicate with the AP 201. In this case, the apparatus is started up with the remote control display lock screen being displayed on the touch panel 116. When the portable terminal apparatus 100 is located inside the communication range with the AP 201, it indicates that the user who is operating the portable terminal apparatus 100 is located near the electronic device 200. Since it is very likely that the user has released the sleep mode of the portable terminal apparatus 100 to remotely control the electronic device 200, starting up the apparatus on the remote control display lock screen allows the user quickly to perform a remote control operation. This improves the operability.

In addition, when wanting to perform an operation other than a remote control operation, the user touches the lock release button 170 with his/her finger and transversely slides it, as in the case of the normal lock screen, and then, through authentication processing, the lock function is released, so that the user can use the apparatus.

Third Embodiment

A portable terminal apparatus 100 according to the third embodiment will be described.

Since the internal configuration, outer appearance, and the like of the portable terminal apparatus 100 are the same as those according to the first and second embodiments, a description will be omitted. Therefore, the first and second embodiments will be referred to, as needed.

FIG. 10 is a flowchart showing an operation of the portable terminal apparatus 100 according to the third embodiment. The same reference characters denote the same steps of operations as in the first embodiment, and a detailed description will be omitted.

The operations 1, the flowchart shown in FIG. 10 start when the user releases the sleep mode by pressing an operation button 119 or the like while the portable terminal apparatus 100 is in the sleep state, as in the first embodiment.

When the operations start, current position information is acquired by a GPS receiving unit 105 (step S1001). If the current position is near a predetermined position (YES in step S1002), the process moves to step S502 to check whether it is possible to communicate with the AP 201. If the current position is not near the predetermined position (NO in step S1002), the process moves to step S510 to start up the apparatus on the normal lock screen. Since operations after step S502 to check whether it is possible to communicate with the AP 201 and operations after step S510 in which the apparatus is started up on the normal lock screen are the same as those in the first embodiment, a detailed description will be omitted.

In this case, the predetermined position is nearly the position of an electronic device 200. In order to acquire the position information of the electronic device 200, the portable terminal apparatus 100 may be placed near the electronic device 200 in advance to acquire the current position information with the GPS receiving unit 105. The acquired position information is recorded in a storage 104 in advance. That is, when the portable terminal apparatus 100 is located near the predetermined position, it means that the portable terminal apparatus 100 is located in a user area 400.

Note that, in the above embodiment, in step S502 to determine whether it is possible to communicate with an AP 201, when the apparatus cannot communicate with the AP 201 (NO in step S502), the apparatus is started up on the normal lock screen (step S510). However, the apparatus may be started up on the remote control display lock screen in a mode of communicating with the electronic device 200 via the base station 500, the external network 310, the router 301, and the home network 300 by wirelessly communicating with the base station 500. Alternatively, the apparatus may be started up on the remote control display lock screen by directly communicating with the electronic device 200 by Bluetooth (registered trademark) or infrared light.

Alternatively, as described in the second embodiment, the startup modes may be switched in accordance with the state of the apparatus before the sleep state.

Note that the present invention includes various modifications and is not limited to the embodiment. For example, the embodiments are described in detail to simplify the description of the present invention. Thus, it is not always necessary to provide all the described configurations. Alternatively, the configurations of the embodiments may partially allow the addition of other configurations, deletion, and replacement in addition, it is also possible to use each embodiment in combination as needed within the scope of the technical idea.

As an example of combining the respective embodiments, when it is determined whether an electronic device can be remotely controlled, such a process may be performed that, after checking ON/OFF of the wireless LAN function as described in the first embodiment, the state of the portable terminal apparatus 100 immediately before the sleep state as described in the second embodiment is checked.

In addition, as a modification, for example, ON/OFF of remote control display may be set in advance by the user, and the above control operations described in each embodiment may be performed only when ON setting is made.

In addition, the respective configurations, functions, processing units, processing methods, and the like described above may be partly or totally implemented by hardware by, for example, designing them with integrated circuits. Alternatively, the respective configurations, functions, and the like described above may be implemented by software by making a processor interpret and execute programs implementing the respective functions. Information such as programs, tables, and files which implement the respective functions can be stored in a memory such as a flash memory or a storage such as a memory card.

Furthermore, the control lines and information lines shown are those considered to be necessary for the description, and all the control lines and information lines are not necessarily illustrated in terms of a product, in practice, almost all the configurations may be considered to be connected to each other.

EXPLANATION OF REFERENCE CHARACTERS

100 . . . portable terminal apparatus, 115 . . . display unit, 116 . . . touch panel, 119 . . . operation button, 200 . . . electronic device, 201 access point.

The invention claimed is:

1. A portable terminal apparatus comprising:
a display;
an operation input interface configured to receive an input corresponding to a user operation;
a wireless communication interface configured to perform communication over a wireless local area network; and
a processor programmed to control state transitions of the portable terminal apparatus to and from a sleep state and further performing a plurality of display modes, the plurality of display modes including:
a first display mode during which a first screen to be moved to a screen for performing authentication to execute an unlock operation is displayed on the display without display of a control icon when the portable terminal apparatus wakes up from a sleep state based on a first condition, wherein the first condition is met when a control screen for remotely and wirelessly controlling an external device via the wireless communication interface is not displayed on the display before the portable terminal apparatus enters a sleep state;
a second display mode during which a first screen to be moved to a screen for performing authentication to execute an unlock operation is displayed on the display without display of a control icon when the portable terminal apparatus wakes up from a sleep state based on a second condition, wherein the second condition is met when the wireless communication interface is unable to communicate with the external device and the control screen is displayed on the display before the portable terminal apparatus enters a sleep state; and
a third display mode during which a control icon and a first screen to be moved to a screen for performing authentication to execute an unlock operation are displayed on the display when the portable terminal apparatus wakes up from a sleep state based on a third condition, wherein the third condition is met when the wireless communication interface is able to communicate with the external device and the control screen is displayed on the display before the portable terminal apparatus enters a sleep state,
wherein the control screen is used to execute control operations on the external device based on the input received by the operation input interface, and
wherein, when the control icon is selected in the third display mode without the unlock operation, the wireless communication interface transmits a remote control signal corresponding to the selected control icon to the external device.

2. The portable terminal apparatus according to claim 1, wherein the portable terminal apparatus is a smartphone and the external device is used for display of a video content.

3. The portable terminal apparatus according to claim 1, wherein the control screen includes a plurality of selectable control icons that enable a user to execute control operations on content being displayed under the control of the external device, the control operations including an operation for selection of content to be displayed.

4. The portable terminal apparatus according to claim 1, further comprising:
a GPS receiver;
a sensor determining a movement state of the portable terminal apparatus;
an infrared sensor;
a gyro sensor determining angular movement of the portable terminal apparatus; and
a physical button executing a predetermined operation when a user pushes the physical button.

5. The portable terminal apparatus according to claim 1, further comprising:
a plurality of physical buttons,
wherein the simultaneous pushing of the plurality of physical buttons results in a single predetermined operation being executed by the portable terminal apparatus.

6. The portable terminal apparatus according to claim 1, wherein the unlock operation in the first display mode, the second display mode, and the third display mode is initiated by sliding the first screen.

7. The portable terminal apparatus according to claim 1, wherein in the third display mode the control icon and the first screen are displayed simultaneously on the display and are arranged such that at least a portion of the control icon is displayed in a top half of the display screen.

8. The portable terminal apparatus according to claim 1, wherein the wireless communication interface is configured to communicate with the external device by implementing an encryption scheme.

9. The portable terminal apparatus according to claim 8, wherein the encryption scheme is WEP (Wired Equivalent Privacy).

10. The portable terminal apparatus according to claim 8, wherein the encryption scheme is WPA (WiFi Protected Access).

11. The portable terminal apparatus according to claim 8, wherein the encryption scheme is WPA (WiFi Protected Access) 2.

12. The portable terminal apparatus according to claim 1, wherein the portable terminal apparatus has a function not to display the control icon even in the third display mode.

13. The portable terminal apparatus according to claim 1, wherein the portable terminal apparatus is configured to allow a user to select whether to display the control icon even in the third display mode.

14. A method executed by a portable terminal apparatus, the method comprising:
receiving, by an operation input interface, an input corresponding to a user operation;
performing wireless communication over a wireless local area network;
controlling state transitions of the portable terminal apparatus to or from a sleep state;
performing a plurality of display modes, the plurality of display modes including:
a first display mode during which a first screen to be moved to a screen for performing authentication to execute an unlock operation is displayed on a display without display of a control icon when the portable terminal apparatus wakes up from a sleep state based on a first condition, wherein the first condition is met when a control screen for remotely and wirelessly controlling an external device via performing the wireless communication is not displayed on the display before the portable terminal apparatus enters a sleep state;

a second display mode during which a first screen to be moved to a screen for performing authentication to execute an unlock operation is displayed on the display without display of a control icon when the portable terminal apparatus wakes up from a sleep state based on a second condition, wherein the second condition is met when the portable terminal apparatus is unable to communicate with the external device via performing the wireless communication and the control screen is displayed on the display before the portable terminal apparatus enters a sleep state; and a third display mode during which a control icon and a first screen to be moved to a screen for performing authentication to execute an unlock operation are displayed on the display when the portable terminal apparatus wakes up from a sleep state based on a third condition, wherein the third condition is met when the portable terminal apparatus is able to communicate with the external device via performing the wireless communication and the control screen is displayed on the display before the portable terminal apparatus enters a sleep state, wherein the control screen is used to execute control operations on the external device based on the input received by the operation input interface; and transmitting via wireless communication a remote control signal corresponding to the selected control icon to the external device when the control icon is selected in the third display mode without unlock operation.

15. The method according to claim 14,
wherein the control screen includes a plurality of selectable control icons that enable a user to execute control operations on content being displayed under control of the external device, the control operations including an operation for selection of content to be displayed.

16. The method according to claim 14, further comprising:
determining a position of the portable terminal apparatus;
determining a movement state of the portable terminal apparatus;
determining angular movement of the portable terminal apparatus; and
executing a predetermined operation when a user pushes a physical button.

17. The method according to claim 14, further comprising:
executing a single predetermined operation when a user simultaneously pushes a plurality of physical buttons on the portable terminal apparatus.

18. The method according to claim 14,
wherein the unlock operation in the first display mode, the second display mode, and the third display mode is initiated by sliding the first screen.

19. The method according to claim 14,
wherein in the third display mode the control icon and the first screen are displayed simultaneously on the display and are arranged such that at least a portion of the control icon is displayed in a top half of the display screen.

20. The method according to claim 14,
wherein performing the wireless communication with the external device includes implementing an encryption scheme.

21. The method according to claim 20,
wherein the encryption scheme is WEP (Wired Equivalent Privacy).

22. The method according to claim 20,
wherein the encryption scheme is WPA (WiFi Protected Access).

23. The method according to claim 20,
wherein the encryption scheme is WPA (WiFi Protected Access) 2.

24. The method according to claim 14,
wherein the portable terminal apparatus has a function not to display the control icon even in the third display mode.

25. The method according to claim 14,
wherein the portable terminal apparatus is configured to allow a user to select whether to display the control icon even in the third display mode.

* * * * *